(12) United States Patent
Hein et al.

(10) Patent No.: US 8,779,717 B2
(45) Date of Patent: Jul. 15, 2014

(54) OFFLINE POWER SUPPLY AND CHARGING APPARATUS

(75) Inventors: David A. Hein, Sterling Heights, MI (US); Krzysztof Klesyk, Novi, MI (US)

(73) Assignee: Lear Corporation, Southfield, MI (US)

( * ) Notice: Subject to any disclaimer, the term of this patent is extended or adjusted under 35 U.S.C. 154(b) by 450 days.

(21) Appl. No.: 13/310,114

(22) Filed: Dec. 2, 2011

(65) Prior Publication Data
US 2013/0141041 A1 Jun. 6, 2013

(51) Int. Cl.
*H01M 10/46* (2006.01)
*H02J 7/00* (2006.01)

(52) U.S. Cl.
CPC ................................. *H02J 7/0036* (2013.01)
USPC ........................................................ 320/104

(58) Field of Classification Search
CPC ..... H02J 7/0027; H02J 7/0032; H02J 7/0036; H02J 7/007; H02J 7/025
USPC .......................... 320/104, 107, 108, 109, 114
See application file for complete search history.

(56) References Cited

U.S. PATENT DOCUMENTS

| | | | |
|---|---|---|---|
| 6,833,685 B2 | 12/2004 | Howard et al. | |
| 8,096,373 B2 * | 1/2012 | Patel et al. | 175/431 |
| 2010/0090628 A1 * | 4/2010 | Endo et al. | 320/167 |
| 2010/0127665 A1 | 5/2010 | Mitsutani | |
| 2010/0308766 A1 | 12/2010 | Erickson | |
| 2011/0163714 A1 | 7/2011 | Ettes et al. | |

* cited by examiner

*Primary Examiner* — Edward Tso
(74) *Attorney, Agent, or Firm* — Brooks Kushman P.C.

(57) ABSTRACT

An offline power supply includes a power supply circuit including a primary-side circuit for connecting to a power source, a secondary-side circuit for connecting to a load, and a transformer connecting the primary-side circuit and the secondary-side circuit. A switch operates to selectively connect the primary-side circuit to the power source. A trigger circuit is connected to the secondary-side circuit and has at least one input. The trigger circuit generates an output to selectively operate the switch based on the at least one input.

20 Claims, 3 Drawing Sheets

OFFLINE POWER SUPPLY AND CHARGING APPARATUS

TECHNICAL FIELD

The present application relates to low-power plug-in battery chargers and power supplies that lower quiescent current draw when the unit is not charging.

BACKGROUND

Existing, standard low-power plug-in chargers are made by many manufacturers and are in widespread use. These chargers have no automatic control to disconnect the transformer primary from AC power. These systems consume energy as long as they are plugged in, whether or not the system is operating.

More generally, existing power supplies result in parasitic non-operating energy waste. An offline power supply continues to consume energy as long as the system is plugged-in, even when the system for which power is being supplied is not operational, such as when the system is off, battery is fully charged, etc.

Examples of such systems include power supplies for laptop computers, plug-in battery chargers for hand-held electronic devices such as cell phones, portable music players. Any "instant on" device that responds to remote control units, such as television sets, cable boxes, also continues to consume energy even when the unit is turned off. This is necessary to allow the unit to be able to respond to the remote control signal.

Put another way, as long as there is an AC transformer plugged into the AC power source, the unit will consume energy. The only way to stop this parasitic power consumption is to remove the AC power source. Removing the AC power source usually requires unplugging the unit from the AC socket. This may be an inconvenience and many users leave units plugged in all the time, resulting in considerable waste of energy when considered across the distribution of households on a continual basis.

An existing high power (200-400 VDC) charger has a switch (transistor) on the primary side of the transformer for control. Since a control signal is necessary to activate this switch and energize the transformer, the system requires an existing battery charge to be present in order to initialize the charger system operation.

Background information may be found in U.S. Pat. Nos. 7,894,212, 6,445,268, 6,198,638, 5,390,101, 6,061,257, and 7,295,449. Further background information may be found in U.S. Pub. Nos. 2003/0210118, 2008/0061746, 2006/0062027.

SUMMARY

In one embodiment, an offline power supply may include a power supply circuit including a primary-side circuit for connecting to a first power source, a secondary-side circuit for connecting to a load, and a first transformer connecting the primary-side circuit and the secondary-side circuit. A switch may operate to selectively connect the primary-side circuit to the first power source. A second power source may be derived from the first power source. A detection circuit powered by the second power source may be connected to the secondary-side circuit. The detection circuit may include at least one input and may generate an output to selectively operate the switch based on the at least one input. A voltage isolation mechanism may be located between the output generated by the detection circuit and the switch. Further, a latch may be located between the output generated by the detection circuit and the voltage isolation mechanism.

It is appreciated that embodiments of the present application may be implemented in a variety of ways. For example, the second power source may be a second transformer. Moreover, the second transformer may be a step-down transformer connected to the first power source reducing the output voltage. The at least one input to the detection circuit may include a trigger input for monitoring the load. The trigger input for monitoring the load may be a connection between the secondary-side circuit and the load. According to one or more embodiments, the connection between the secondary-side circuit and the load may be detected using a control pilot signal or proximity detection.

In another embodiment, an apparatus, cord-set, or wall-station for charging a plug-in vehicle is provided. The apparatus may include a power supply circuit including a primary-side circuit for connecting to a power source, a secondary-side circuit for connecting to the vehicle, and a transformer connecting the primary-side circuit and the secondary-side circuit. A switch may operate to selectively connect the primary-side circuit to the power source. A trigger circuit may be connected to the secondary-side circuit and may include at least one input. The trigger circuit may generate an output to selectively operate the switch based on the at least one input. The at least one input may include a trigger input for monitoring the connection to the vehicle.

It is appreciated that embodiments of the present application may be implemented in a variety of ways. For example, the trigger circuit may be a buffer circuit. Alternatively, the trigger circuit may be a low power detection circuit powered separately from the secondary-side circuit.

In yet another embodiment, an apparatus, cord-set, or wall-station for charging a plug-in vehicle is also provided. The apparatus may include a power supply circuit including a primary-side circuit for connecting to a power source, a secondary-side circuit for connecting to the vehicle, and a transformer connecting the primary-side circuit and the secondary-side circuit. At least one switch may operate to selectively power various components contained in the secondary-side circuit. A trigger circuit may be connected to the secondary-side circuit and may include at least one input. The trigger circuit may generate an output to selectively operate the at least one switch based on the at least one input. The at least one input may include a trigger input for monitoring the connection to the vehicle.

It is appreciated that embodiments of the present application may be implemented in a variety of ways. For example, the at least one switch may include a positive voltage supply switch and a negative voltage supply switch for selectively powering the various components contained in the secondary-side circuit. Moreover, the power source for operating the trigger circuit may be unswitched.

DETAILED DESCRIPTION

As required, detailed embodiments of the present application are disclosed herein; however, it is to be understood that the disclosed embodiments are merely exemplary of an invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments of the present application.

In accordance with one or more embodiments of the present application, an intelligent offline power supply can detect that there is negligible operating current and as a result can disconnect the primary side of an AC transformer. This has the same effect as un-plugging the power supply from the AC power source. When the AC source is disconnected from the primary side, the power supply may cease to consume energy except for a low power detection circuit that remains powered. When system operation current draw is detected by the low power detection circuit, the AC power source may be reconnected to the primary side thereby resuming normal operation of the transformer. In this embodiment, the low power detection circuit itself may be powered separately from the rest of the power supply circuit using a relatively low voltage produced by a step-down transformer connected to the AC power source.

It is appreciated that embodiments of the present application may have many applications. For example, embodiments of the present application may be suitable for all low-power products that use a plug-in charger or offline power supplies and consumer electronics devices that maintain some minimal level of operation in their off state. In particular, embodiments of the present application may be suitable for battery charging products such as the charger cord set for plug-in hybrid vehicles. And in general, embodiments of the present application may be suitable for all commercial chargers in which a transformer may be normally left plugged in.

Figure 1:
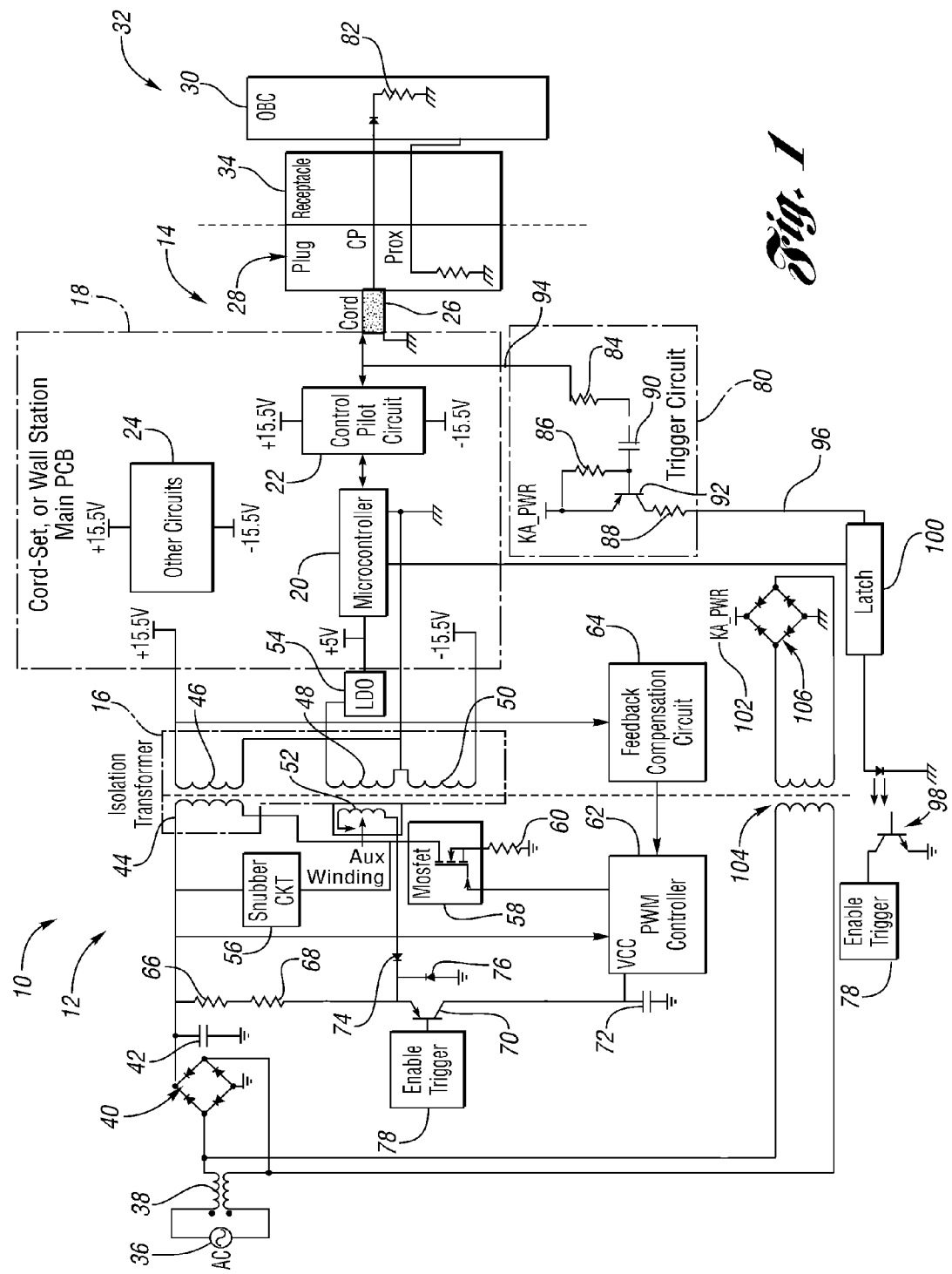
FIG. 1 illustrates an exemplary offline power supply for use in a plug-in hybrid vehicle application, according to one or more embodiments of the present application.

FIG. 1 illustrates an offline power supply for use in a plug-in hybrid vehicle application, according to one or more embodiments of the present application. The entire power supply apparatus (cord-set or wall station) is generally indicated at 10. The power supply may generally include a primary-side circuit 12 and a secondary-side circuit 14 connected by an isolation transformer 16. The secondary-side circuit 14 may include a cord-set or wall station main PCB 18, which itself may include a microcontroller 20, control pilot circuit 22, and other circuits 24.

The power supply may also include a cord 26 and a plug 28. The plug 28 may be configured such that a connection to an on-board charger (OBC) 30 of a vehicle 32, via a plug receptacle 34, causes a control pilot signal or proximity detection. In general, main PCB 18, microcontroller 20, control pilot circuit 22, other circuits 24, and plug 28 may operate in a suitable fashion as understood by one of ordinary skill in the art.

An AC power source 36 may supply power to the power supply circuitry, which includes the primary-side circuit 12 and the secondary-side circuit 14. The primary-side circuit 12 may connect the AC power source 36 to the power supply 10. For instance, the AC power source 36 may be connected to input filtering circuitry 38, as well as to diode bridge 40 and capacitor 42. The rectified DC voltage may be connected to the isolation transformer 16. Transformer 16 may include primary winding 44, and a series of secondary windings 46, 48, 50; the transformer 16 may also include auxiliary winding 52. Low-dropout regulator 54 may provide a regulated voltage for microprocessor 20. The switched power supply may provide output voltages from AC power source 36 in a known manner, via operation of snubber circuit 56, switch 58, resistor 60, and PWM controller 62, which may receive input from feedback compensation circuit 64.

With continuing reference to FIG. 1, VCC may be provided to PWM controller 62 via resistors 66, 68, transistor 70, capacitor 72, and auxiliary winding 52 connected to transistor 70 via diodes 74, 76. Transistor 70 may operate as a switch to selectively connect the primary-side circuit 12 and the transformer 16 to the AC power source 36 in response to an enable trigger signal 78 as will be described in greater detail below. Otherwise, operation of the overall power supply may occur in a suitable manner as understood by one of ordinary skill in the art.

In accordance with one or more embodiments of the present application, a trigger circuit 80 may detect connection of the plug 28 to the receptacle 34 of the OBC 30 using a control pilot resistance introduced by resistor 82. The trigger circuit 80 may include, for example, resistors 84, 86, 88, capacitor 90, and transistor 92, and may operate as a low power detection circuit in response to at least one input 94 (e.g., the control pilot signal) in a suitable manner as understood by one of ordinary skill in the art. For instance, once the power supply is connected to the OBC 30, capacitor 90 may accumulate charge, which may drive transistor 92 to generate an output 96 in the form a wake-up signal.

According to one or more embodiments of the present application, the trigger circuit 80 may be electrically isolated from the primary side of transformer 16 using a voltage isolation mechanism or components, such as optocoupler 98. The wake-up signal from the trigger circuit may be utilized to drive the low voltage side of optocoupler 98, thereby generating the enable trigger signal 78. As previously mentioned, the enable trigger signal 78 may selectively operate transistor 70 for switching on the power supply 10 by connecting the primary side of transformer 16 to the AC power source 36.

In some implementations, a latch 100 may be introduced between the trigger circuit 80 and the optocoupler 98. The latch 100 may keep the optocoupler 98 active long enough for microcontroller 20 to complete its operations in the event the wake-up signal pulse from the trigger circuit 80 is not sufficiently long enough to do so itself. In this regard, the latch 100 may also be connected to the microcontroller 20. Accordingly, when the wake-up signal pulse is gone, the microcontroller 20 may drive the optocoupler 98, via the latch 100, until the microcontroller goes back to sleep. In an alternate embodiment, the microcontroller 20 may be connected directly to the optocoupler 98 when no latch is used in order to keep the primary-side circuit 12 powered while the microcontroller 20 completes its operations.

The power supply 10 may include a second, low-voltage power source 102, derived from the AC power source 36, to separately power the trigger circuit 80. According to one or more embodiments, the second power source 102 may be provided by a step-down transformer 104. The step-down transformer 104 may be a relatively small transformer connected to diode bridge 106 for stepping down the AC voltage from the AC power source 36 to a relatively low rectified DC voltage (e.g., 10-12 volts). The relatively low rectified DC voltage may be referred to as the keep-alive power source. Accordingly, the step-down transformer 104 and the optocoupler 98 may allow for the complete shutdown of all power supply components except for the low power trigger circuit 80 when the power supply 10 is disconnected from a vehicle.

Figure 2:
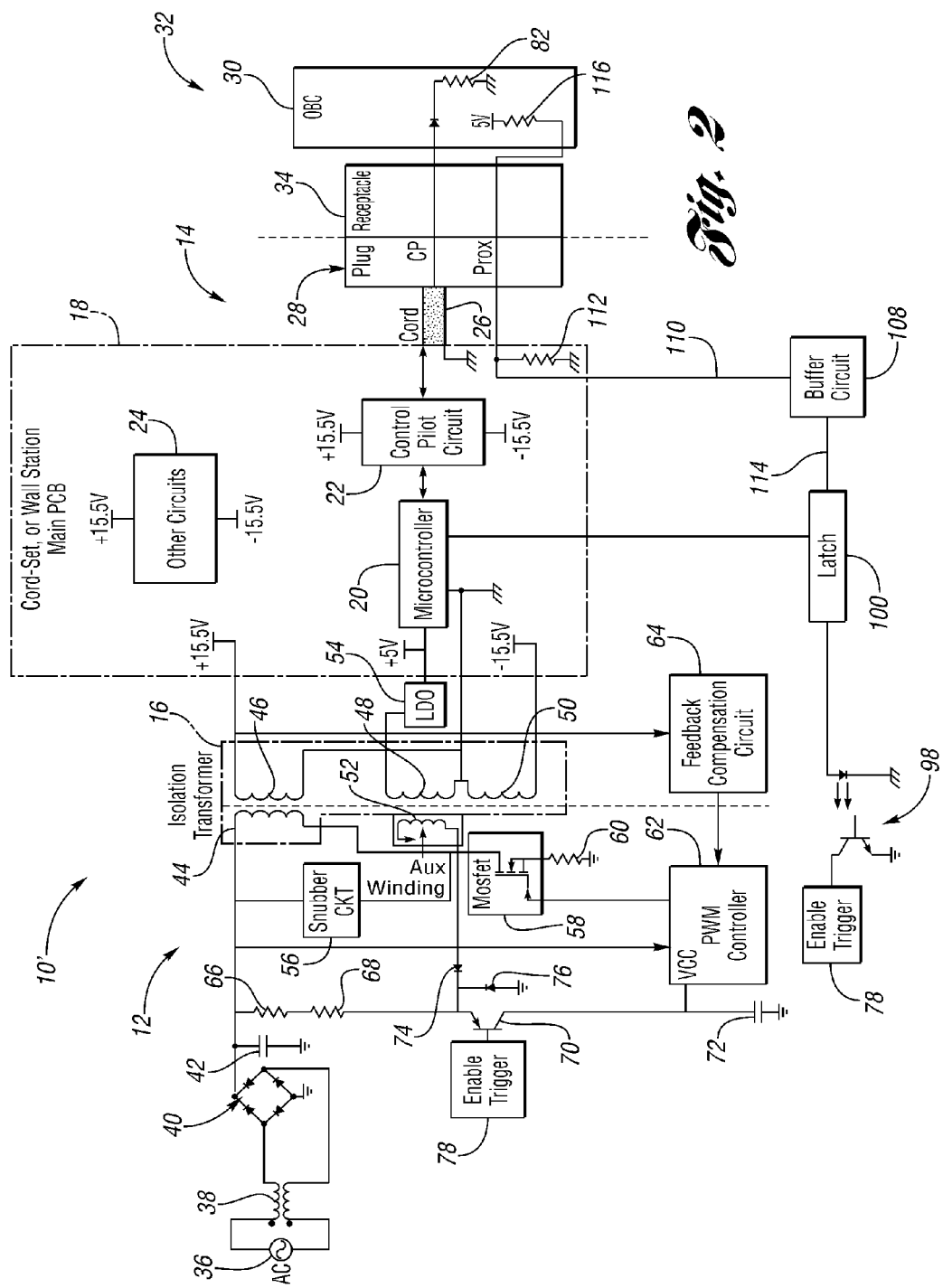
FIG. 2 illustrates another exemplary offline power supply for use in a plug-in hybrid vehicle application, according to one or more embodiments of the present application.

FIG. 2 illustrates an alternate configuration for an offline power supply 10', according to one or more embodiments of the present application. The alternate configuration depicted in FIG. 2 may be employed when using proximity detection to signal when the power supply is connected to a vehicle. As shown in FIG. 2, wherein like reference numbers correspond to like elements, the power supply 10' may include a buffer circuit 108 instead of a low power detection circuit. The buffer circuit 108 may operate as a trigger circuit for selectively activating the primary side of the transformer 16 by connecting the primary-side circuit 12 to the AC power source 36.

The buffer circuit 108 may include at least one input 110. For example, the buffer circuit 108 may be connected to a proximity signal input contained in plug 28. The proximity signal input to the buffer circuit 108 may be normally pulled low via resistor 112 when the plug 28 is disconnected from the vehicle 32. The buffer circuit 108 may generate an output 114 in the form of a wake-up signal upon connection of the power supply to the OBC 30 of the vehicle 32 in a suitable fashion as understood by one of ordinary skill in the art. For instance, a resistor 116 connected to a regulated voltage (e.g., 5 volts) in the OBC 30 may pull up the normally low proximity signal input 110 to the buffer circuit 108. The buffer circuit 108 may utilize an edge trigger to generate the wake-up signal output 114 when the proximity signal input 110 is pulled high indicating a connection to the vehicle 32.

As described above with respect to FIG. 1, the wake-up signal may be utilized to drive the low voltage side of optocoupler 98, thereby generating the enable trigger signal 78 that activates the primary side of transformer 16 via transistor 70. Moreover, the latch 100 may be introduced between the buffer circuit 108 and optocoupler 98 to keep optocoupler 98 active long enough for microcontroller 20 to complete its operations. In this regard, the latch 100 may also be connected to the microcontroller 20 so that the microcontroller may drive optocoupler 98, via the latch 100, when the wake-up signal pulse is gone, until the microcontroller goes back to sleep. In an alternate embodiment, microcontroller 20 may be connected directly to optocoupler 98 when no latch is used on order to keep the primary-side circuit 12 of the power supply powered while the microcontroller 20 completes its operations. In using proximity detection with the buffer circuit 108, a separate power source may not be required.

Figure 3:
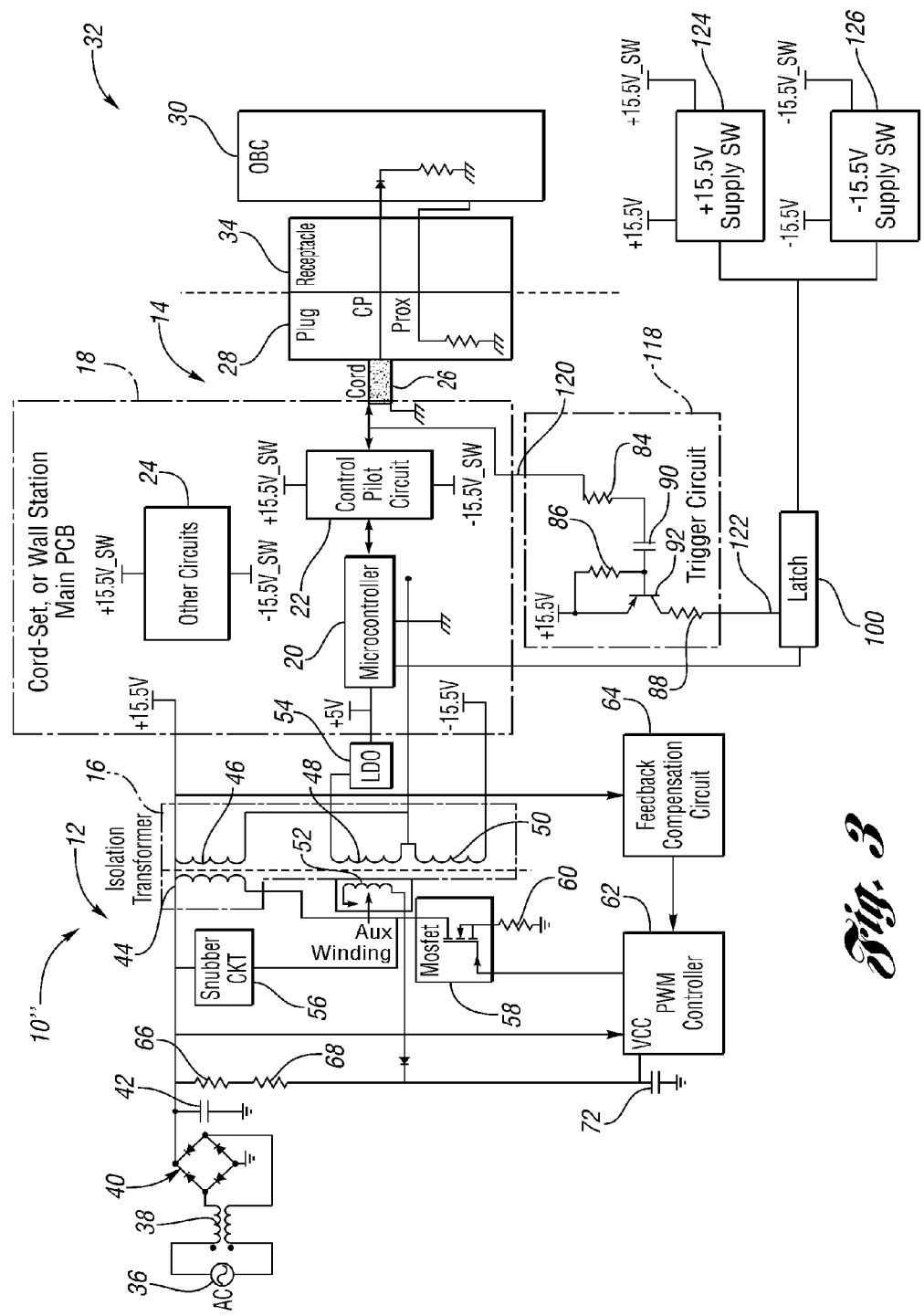
FIG. 3 illustrates yet another exemplary offline power supply for use in a plug-in hybrid vehicle application, according to one or more embodiments of the present application.

FIG. 3 illustrates another alternate configuration for an offline power supply 10" for reducing quiescent current draw, according to one or more embodiments of the present application. As shown in FIG. 3, the control pilot circuit 22 and other circuits 24 in the main PCB 18 may be connected to a switched power source (e.g., +15.5V_SW, −15.5V_SW). Moreover, the power supply 10" may include a trigger circuit 118 similar to the low power trigger circuit 80 from FIG. 1. However, in the FIG. 3 configuration, the trigger circuit 118 may be powered directly using the rectified DC voltage from transformer 16 (e.g., 15.5 volts), which may remain unswitched.

The trigger circuit 118 may have at least one input 120 for detecting a connection to the vehicle 32. For instance, the trigger circuit 118 may use the control pilot signal to detect a connection to the vehicle. In response to the control pilot signal, the trigger circuit 118 may generate an onput 122 that operates at least one switch. The at least one switch may include a positive voltage supply switch 124 and a negative voltage supply switch 126. The positive and negative voltage supply switches 124, 126 may be implemented in a suitable manner as understood by one of ordinary skill in the art.

Moreover, the positive and negative voltage supply switches 124, 126 may selectively power one or more components contained in the secondary-side circuit 14. For instance, the positive and negative voltage supply switches 124, 126 may control operation of the control pilot circuit 22 and other circuits 24. In this regard, although the primary-side circuit 12 remains active when the power supply 10" is not in use, the control pilot circuit 22 and other circuits 24 may be switched off to minimize back-end consumption. All control circuits and components, except for the trigger circuit 118, may remain shut down until a wake-up event occurs (e.g., connection to the vehicle). As a result, power consumption can be significantly reduced when the power supply is not in use.

As described above with respect to FIG. 1, the latch 100 may be used to keep the positive and negative voltage supply switches 124, 126 switched on long enough for the microcontroller 20 to complete its operations before going back to sleep. Moreover, the positive and negative voltage supply switches 124, 126 can be triggered using proximity detection, as described above with respect to FIG. 2, instead of the control pilot signal.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An offline power supply comprising:
a power supply circuit including a primary-side circuit for connecting to a first power source, a secondary-side circuit for connecting to a load, and a first transformer connecting the primary-side circuit and the secondary-side circuit;
a switch operable to selectively connect the primary-side circuit to the first power source;
a second power source derived from the first power source; and
a detection circuit powered by the second power source and connected to the secondary-side circuit, the detection circuit having at least one input and generating an output to selectively operate the switch based on the at least one input.

2. The offline power supply of claim 1, wherein the second power source is a second transformer.

3. The offline power supply of claim 2, wherein the second transformer is a step-down transformer connected to the first power source for lowering output voltage.

4. The offline power supply of claim 1, wherein the at least one input includes a trigger input for monitoring the load.

5. The offline power supply of claim 4, wherein the trigger input is a connection between the secondary-side circuit and the load.

6. The offline power supply of claim 5, wherein the connection between the secondary-side circuit and the load is detected using a control pilot signal.

7. The offline power supply of claim 5, wherein the connection between the secondary-side circuit and the load is detected using proximity detection.

8. The offline power supply of claim 1 further comprising:
a voltage isolation mechanism disposed between the output generated by the detection circuit and the switch.

9. The offline power supply of claim 8, wherein the voltage isolation mechanism is an optocoupler.

10. The offline power supply of claim 8 further comprising:
a latch disposed between the output generated by the detection circuit and the voltage isolation mechanism.

11. The offline power supply of claim 10, wherein the latch is connected to a microcontroller provided in the secondary-side circuit.

12. An apparatus, cord-set, or wall-station for charging a plug-in vehicle, the apparatus comprising:
a power supply circuit including a primary-side circuit for connecting to a power source, a secondary-side circuit for connecting to the vehicle, and a transformer connecting the primary-side circuit and the secondary-side circuit;
a switch operable to selectively connect the primary-side circuit to the power source; and
a trigger circuit connected to the secondary-side circuit and having at least one input, the trigger circuit generating an output to selectively operate the switch based on the at least one input,
wherein the at least one input includes a trigger input for monitoring the connection to the vehicle.

13. The apparatus of claim 12, wherein the trigger circuit is a buffer circuit.

14. The apparatus of claim 12, wherein the trigger circuit is a low power detection circuit.

15. The apparatus of claim 14 further comprising:
a step-down transformer connected to the power source for lowering output voltage, wherein the step-down transformer powers the low power detection circuit.

16. The apparatus of claim 12 further comprising:
a voltage isolation mechanism disposed between the output generated by the trigger circuit and the switch.

17. The apparatus of claim 16 further comprising:
a latch disposed between the output generated by the trigger circuit and the voltage isolation mechanism.

18. An apparatus, cord-set, or wall-station for charging a plug-in vehicle, the apparatus comprising:
a power supply circuit including a primary-side circuit connecting to a power source, a secondary-side circuit for connecting to the vehicle, and a transformer connecting the primary-side circuit and the secondary-side circuit;
at least one switch operable to selectively power one or more components contained in the secondary-side circuit; and
a trigger circuit connected to the secondary-side circuit and having at least one input, the trigger circuit generating an output to selectively operate the at least one switch based on the at least one input,
wherein the at least one input includes a trigger input for monitoring the connection to the vehicle.

19. The apparatus of claim 18, wherein the at least one switch includes a positive voltage supply switch and a negative voltage supply switch for selectively powering the one or more components contained in the secondary-side circuit, and wherein power to the trigger circuit is unswitched.

20. The apparatus of claim 18 further comprising:
a latch disposed between the output generated by the trigger circuit and the at least one switch.

* * * * *